No. 11,931. Reissued Sept. 17, 1901.

F. RITTER.

DENTAL CHAIR.

(Application filed Jan. 9, 1901.)

4 Sheets—Sheet 1.

Witnesses

Geo. Innis

C. M. Catlin

Inventor

Frank Ritter

By Benj. R. Catlin Attorney

No. 11,931. Reissued Sept. 17, 1901.

F. RITTER.

DENTAL CHAIR.

(Application filed Jan. 9, 1901.)

4 Sheets—Sheet 2.

Witnesses

Jno. Imrie

C. M. Catlin

Inventor

Frank Ritter

By Benj. R. Catlin Attorney

No. 11,931. Reissued Sept. 17, 1901.

F. RITTER.

DENTAL CHAIR.

(Application filed Jan. 9, 1901.)

4 Sheets—Sheet 3.

Witnesses

Geo. Mine

C. M. Catlin

Inventor

Frank Ritter

By Ruy R. Catlin Attorney

No. 11,931. Reissued Sept. 17, 1901.

F. RITTER.

DENTAL CHAIR.

(Application filed Jan. 9, 1901.)

4 Sheets—Sheet 4.

Witnesses

C. M. Catlin

Inventor

Frank Ritter

By Wm. R. Catlin Attorney

UNITED STATES PATENT OFFICE.

FRANK RITTER, OF ROCHESTER, NEW YORK.

DENTAL CHAIR.

SPECIFICATION forming part of Reissued Letters Patent No. 11,931, dated September 17, 1901.

Original No. 619,228, dated February 7, 1899. Application for reissue filed January 9, 1901. Serial No. 42,704.

*To all whom it may concern:*

Be it known that I, FRANK RITTER, a resident of Rochester, in the county of Monroe and State of New York, have invented certain new and useful Improvements in Dental Chairs, (heretofore patented to me in British Letters Patent dated September 3, 1897, and numbered 20,295;) and I do hereby declare the following to be a full, clear, and exact description of the invention, such as will enable others skilled in the art to which it pertains to make and use the same.

The invention relates to dental chairs, and has for its object to increase their stability, compactness, ease of operation, and efficiency.

The invention consists in the construction hereinafter described and pointed out.

Figures 1, 8, 9:
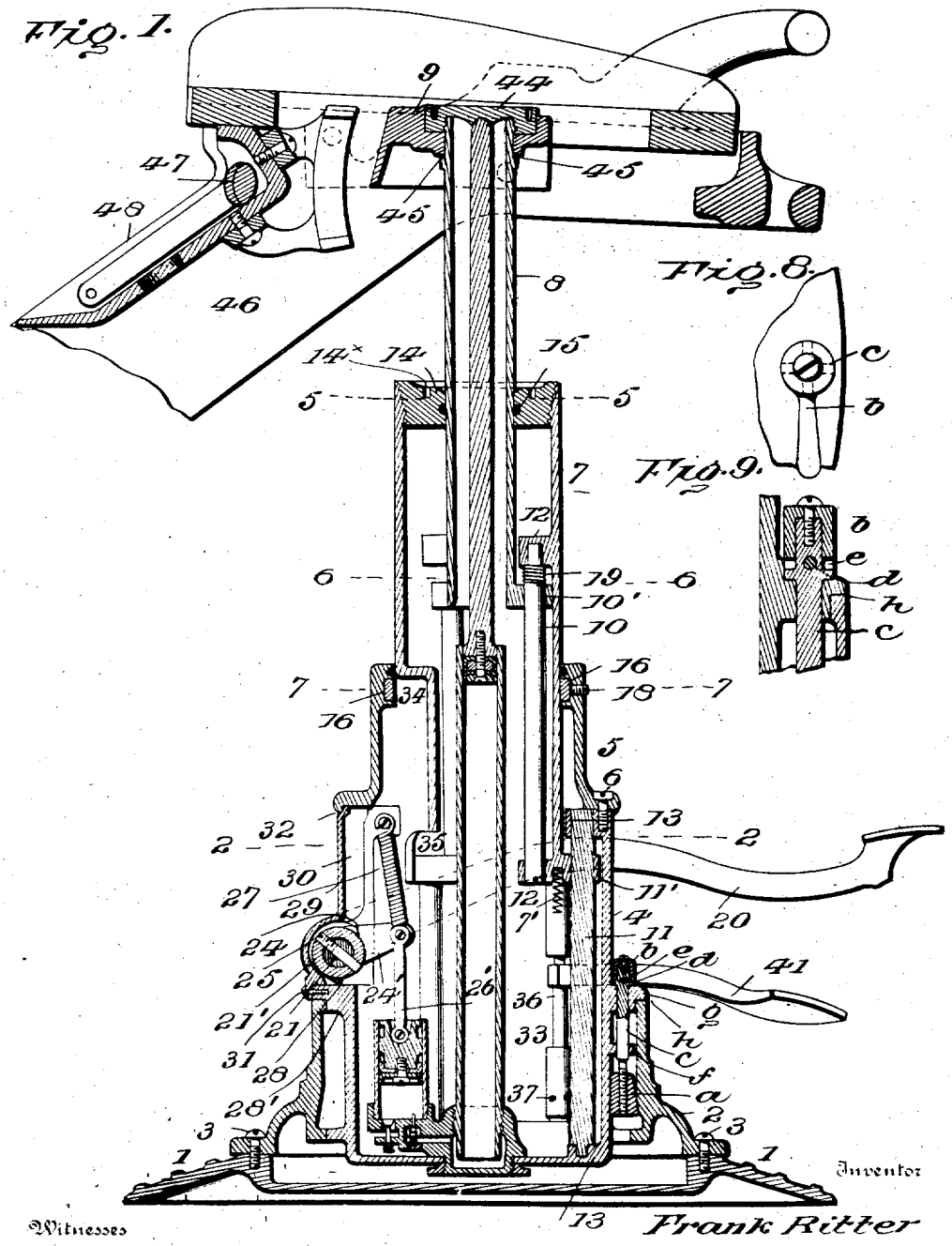
Figure 3:
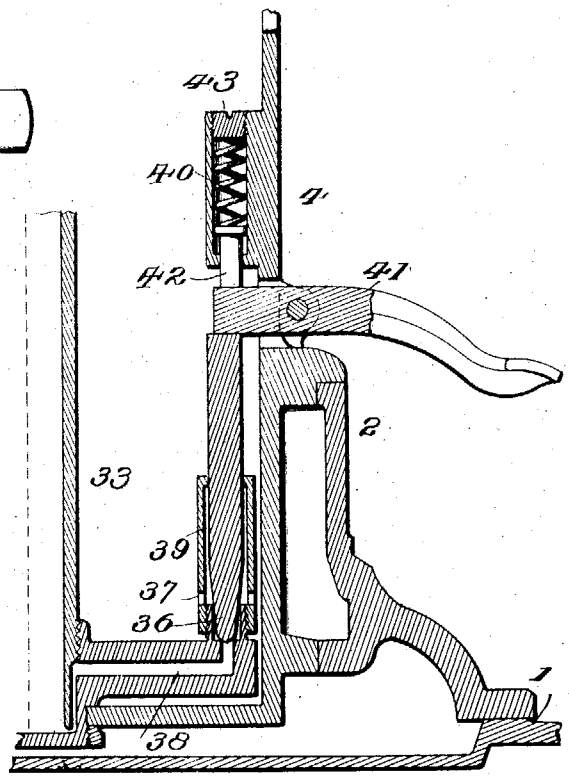
Figure 2:
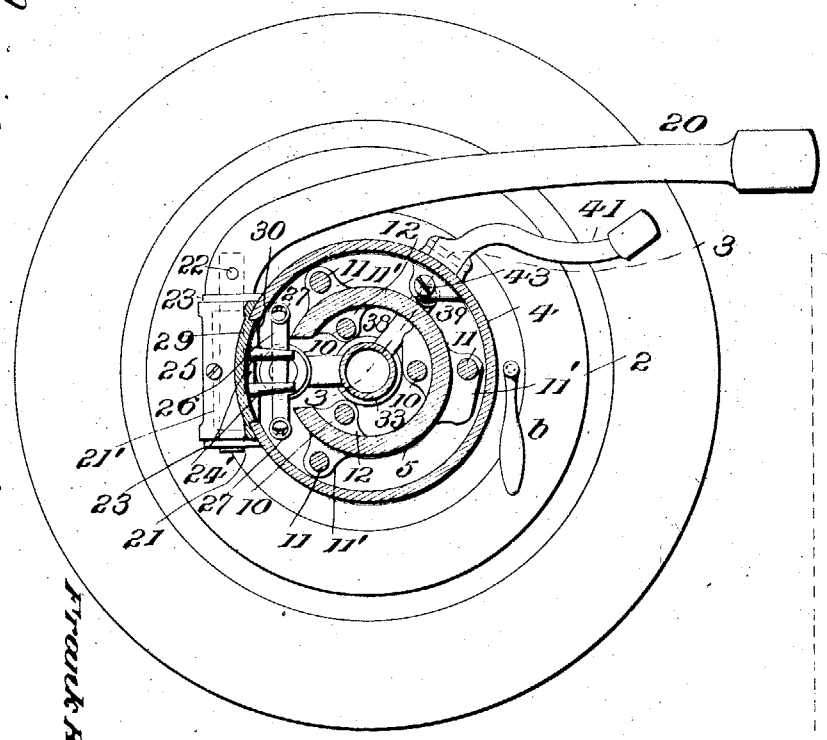
Figure 5:
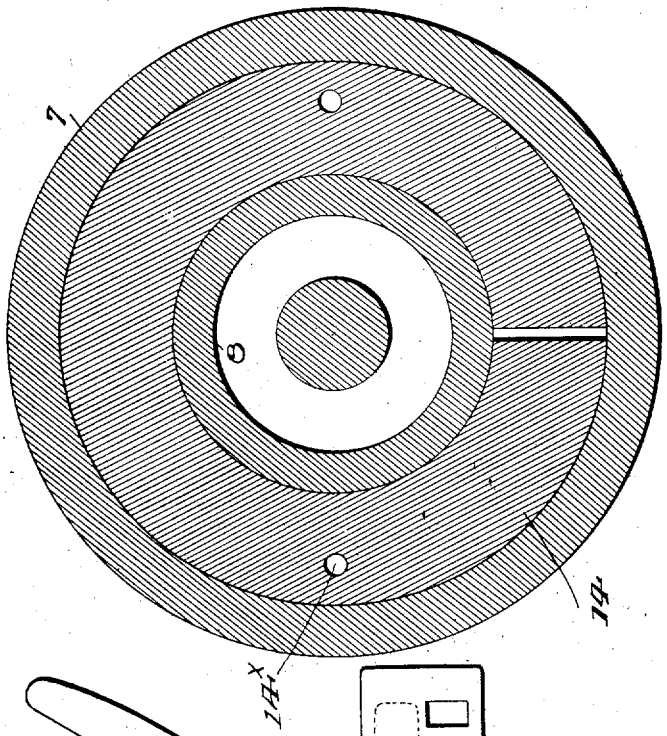
Figure 4:
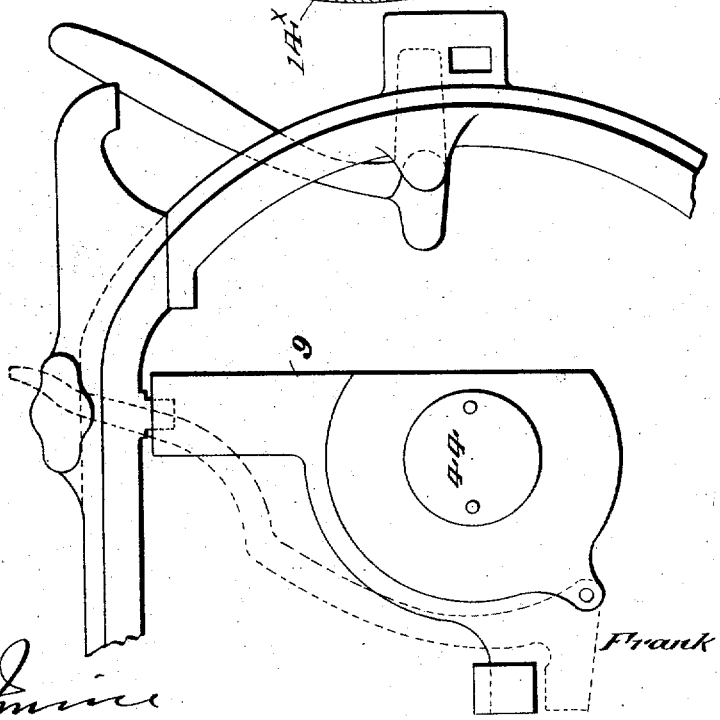
Figure 6:
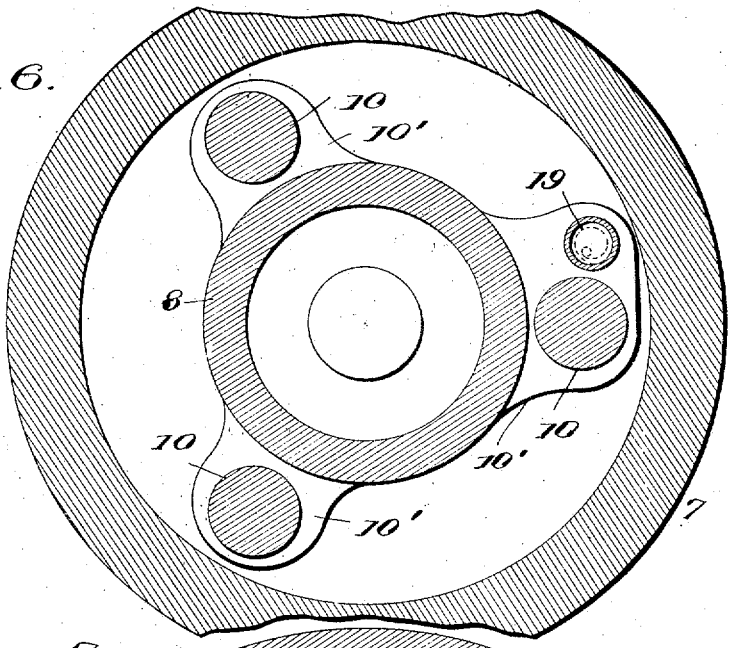
Figure 7:
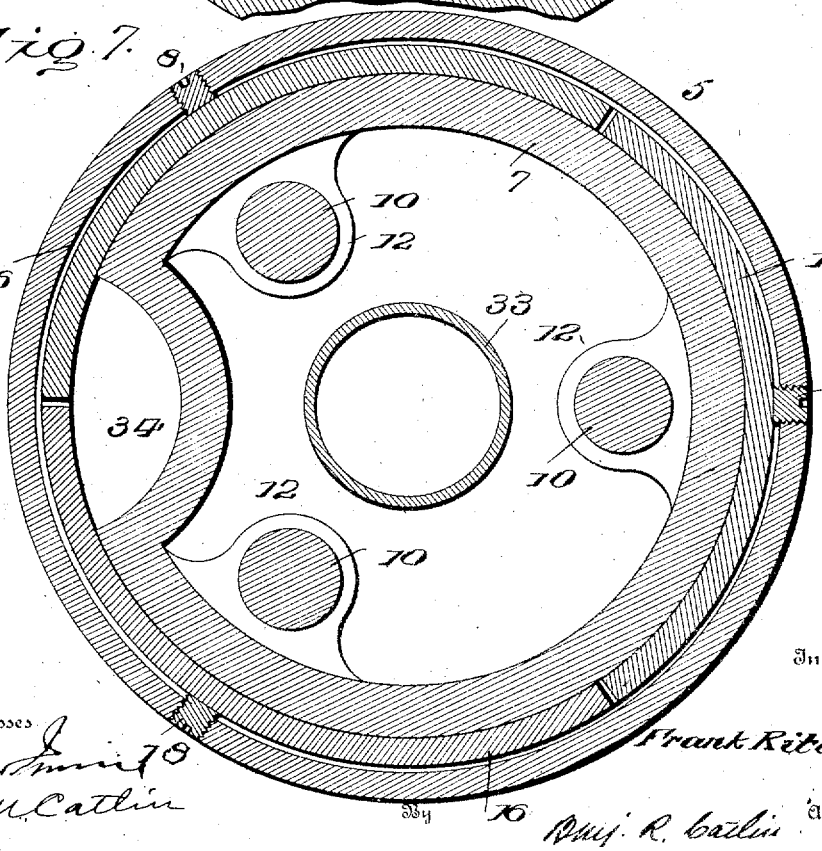

In the accompanying drawings, Figure 1 is a vertical section of a chair-base, pedestal, and seat-elevating mechanism. Fig. 2 is a section on line 2 2 of Fig. 1. Fig. 3 is a section on line 3 3 of Fig. 2. Fig. 4 is a partial plan of the seat-frame and cross-bar. Figs. 5, 6, and 7 are sections on the lines 5 5, 6 6, and 7 7, respectively, of Fig. 1. Fig. 8 is a plan of a bar for operating a locking device, and Fig. 9 is a partial section of said bar and locking device.

Numeral 1 denotes the bottom, and 2 an approximately cylindrical body, of a chair-base, said parts of the base being fixed to each other by screws 3.

4 denotes a lower part of a chair-pedestal. This pedestal-section has an extension pendent within the base-body and having a closed bottom, which downward extension serves as an oil-holder. 5 is an extension fixed to part 4 by screws 6. The pedestal has an exterior annular projection *g*, whereby it rests rotatably on the base, and the base and pedestal may at will be fastened in fixed relation to each other by a wedge-shaped block *a*, operated by a lever *b*, secured by a screw to the top of a short rod *c*, having a screw-thread connection with the block *a*. The rod fits a socket in the end of the lever and is further fixed thereto by a transverse pin *d*. In the walls of this socket on the under side are a series of slots *e*, oppositely situated to fit over the pin, and thus connect the rod and bar. These slots provide for different adjustments of the lever to compensate for wear.

*f* is a guide for the rod *c*, and said rod is also guided by the projection *g*.

A slight movement of lever *b* raises or lowers the wedge-block either to tighten or loosen the connection between the base and pedestal. When the wedge is raised, the shoulder *h* of the pedestal projection is simultaneously forced down upon the edge of the base.

7 is a tube movable lengthwise the pedestal.

8 is a movable tube fixed to the cross-bar 9 of the seat-frame. When the chair-seat descends to its lowest position, the foot of said tube 8 and also the foot of tube 7 are moved down within an oil-holder and adjacent a pump, to be described.

The tubes 8 and 7 are elevated in the usual manner by a pump, and they are telescopically connected with each other, and the latter is telescopically connected with the pedestal extension 5, and these movable parts are guarded against independent lateral movements and against all binding action by rods 10 and 11. The rods are fixed in flanges or projections 12 and 13, formed on the tube and pedestal, as shown. The rods 10 each fit an opening in a flange or projection 10′ on the tube 8, and the foot of said tube is accurately guided by the rods and held horizontally in fixed relation to the tube 7. These rods obviate the use of keys and keyways heretofore employed. The rods 11 in like manner fit suitable openings in the flanges or projections 11′ on the foot of the tube 7, and the foot of said tube is guided by the said rods. At the foot of tube 7 is a pendent spring 7′, adapted to obviate jar when said tube reaches the bottom of the reservoir. The said tube 8 is also guided and steadied by a frusto-conical split plug 14, which has a central opening receiving said tube. In the wall of the opening is a lubricating-packing 15. The construction is such that the plug can be screwed up or down in its seat in the tube 7 to insure its fitting the tube 8 suitably, and means, such as holes 14×, to receive a spanner are provided for the purpose. This enables the plug to be adjusted to compensate for wear and also to vary its friction with the part 8. The plug can also be removed to permit the introduction of the foot of the tube 8 into the tube 7 in assembling the parts, or the tube 8 can be introduced from below without removing this plug.

16 denotes a packing-ring comprising three separate sections movably held in a recess formed in the inside of the pedestal extension 5, and 18 denotes screws for setting the ring-sections up against tube 7. These can be manipulated to nicely center the bearing and regulate the friction. Each section is separately adjustable.

19 indicates a spring seated in a flange 10′ and between it and a flange 12 to prevent jar when the seat ascends.

20 denotes a foot-lever fixed to a short rod 21 by pin 22. Said rod has bearings in the wings or projections 23 of the pedestal, which wings constitute the fulcrum of the pump-lever. 24 is the short member of the lever, having parallel arms 24′, and 25 is a screw for fixing a sleeve 21′ of said lever member to the rod 21. The lever supports in its arms 24′ a rod 26, to which at its middle point is loosely connected the upper end of piston-rod 26′ of a pump. Returning-springs are denoted by 27. These are attached to the ends of rod 26 and to the fixed pedestal-section.

28 denotes a projection upon the lever to arrest the same and stop the returning action of the springs whenever said projection engages the part 28′ of the pedestal. In Fig. 1 the stop 28 is indicated as held against said part by the action of the springs.

29 is a detachable cover fitting an opening 30 in the pedestal-wall and held thereto by screws 31. The upper part of the cover or door 29 engages a flange or rib 32 at the top of the opening 30. This opening provides for inspection and repairs within the pedestal and reservoir. The cover excludes dust and maintains the symmetry of the pedestal. The rod 21, constituting a part of the lever 20, extends outside the pedestal and fits bearings in ears 23 closely to avoid entrance of dust.

33 denotes a fixed piston-tube. In order to provide space for the pump and other parts without enlarging the base and reservoir laterally and without interfering with the descent of the tube 7, the wall of said tube is inset at 34 and said inset portion cut off at its bottom, as shown at 35. This permits the foot of tube 7 to drop below the main part of the pump-cylinder, though the latter is situated partly within the circumference of the upper part of the tube. The inset part of tube 7 is cut away at 35, as shown in Figs. 1 and 2. This leaves an opening in the foot of the tube adjacent door 30 and provides that when the tubes are assembled the inset will not prevent turning the tubes and their flanges, so that the openings in the latter may register.

The seat is raised by pumping oil into the tubes, as usual. A pump provided with suitable valves and piston and a piston-rod 26′ are indicated in Fig. 1.

36 denotes a valve which is opened to permit the oil to return to the reservoir and lower the seat.

37 denotes oil-outlets, and 38 is an oil-escape passage, whereby the oil flows to the reservoir when the valve is raised.

39 is a valve-stem guide.

40 is a spring normally closing the valve, and 41 a spring-compressing lever.

42 is a movable plug or piston held loosely on the lever 41 by the spring.

43 is a screw-plug to adjust the tension of the spring.

To enable the seat to be adjusted horizontally with respect to its support, the tube 8 is fastened to the cross-bar by a nut 44 screwing upon the tube and forcing the said bar and a shoulder 45 on the tube toward each other, whereby the bar is held between said nut and shoulder until the nut is loosened, whereupon the seat-frame can be independently rotated.

As it is desirable that the seat be as low as possible with respect to the elevating devices, the cross-bar is situated in the plane of the seat-frame and is recessed to receive said nut 44, which in use does not extend above the bar nor interfere with the seat. The plunger-rod bears upon the under side of the nut, which serves the double purpose of clamping the tube 8 to the cross-bar and providing a bearing for the free end of the plunger-rod.

46 indicates the platform extension of the seat-frame, and 47 is a child's foot-rest folded back in inoperative situation in a recess 48.

One of the main objects of the invention is to provide that the above-described telescoping parts shall move smoothly and without wabbling or binding. For this a plurality of guide-rods constructed and arranged as specified is very efficient. Three rods for each movable part arranged circumferentially, as shown, are very suitable, though the improvement is not limited to the particular number. As the movable sections descend at times into the oil-holder, they and their connections are thereby constantly lubricated.

The accessibility and detachability of the various parts are desirable, and novel features of construction are employed. The space occupied and the danger of breaking in transportation are thereby diminished, as also is the cost of repairs. The accessibility of the pump and its operating devices is a practically important feature. The described construction whereby these and other advantages are secured are hereinafter pointed out, and the best forms and arrangements known to me have been set forth; but variations that involve simple mechanical skill and that have the same principles of construction and operation are not excluded.

I am aware that a fixed plunger-tube has been closed at the top by a cap having its top perforated for the passage of a plunger-rod and that a so-called "combined nut and wedge" has been proposed for use with a coupling for tubular rails, the purpose and effect being to produce a fixed connection of a coupling and rail. Said nut and wedge was provided with a screw-threaded portion and a head and the threaded portion provided with kerfs extending directly across a part of the threads, the head and upper screw-threaded portion being circumferentially integral. Such devices are not of my invention, which comprises a frusto-conical plug split through its entire length, as required for the purposes of my improvement, which contemplates a uniform bearing of the plug upon the tube embraced by it and a consequent uniformity of wear throughout its entire length and a capacity for nicety of adjustment.

Having described my invention, what I claim is—

1. In a dental chair, a supporting-base, a pedestal, a plurality of rotatable telescoping tubes, one of said telescoping tubes carrying on its interior a guide-rod fixed at both ends near its inner surface, another tube carrying on its exterior a projection movably fitting said rod, substantially as described.

2. In combination with seat-elevating mechanism, the fixed base, the rotatable pedestal having fixed therein a guide-rod 11, a telescoping tube 7 movably connected to said rod and carrying on its interior a rod 10, and a telescoping tube 8 movably connected with said rod 10, said tube 7 having at its foot an interior flange to hold its rod and an exterior flange to embrace the pedestal-rod, substantially as described.

3. In combination with the seat and tube elevating and lowering mechanism, a base, the telescoping tubes, flanges 12 within the exterior tube, a guide-rod 10 fixed to the said flanges, a flange 10′ on the exterior of the inner telescoping tube, said rod being freely movable through the flange, and a spring situated between flange 10′ and one of the flanges 12, substantially as described.

4. In combination with the tube and seat elevating and lowering mechanism, a base, the telescoping tube 8, the telescoping tube 7 having flanges 12 at its top and bottom and a flange 11′ at its bottom, the rotatable pedestal, a guide-rod fixed in the pedestal, said flange 11′ being movable on the rod, a guide-rod for the telescoping tube 8 fixed to the flanges 12 inside the tube 7 and a spring 7′ pendent from the foot of said tube, substantially as described.

5. In a dental chair, the combination of the base, a pedestal rotatably supported on said base and having an extension pendent therein, the wedge-block situated between the pendent part of the pedestal and the base, and devices comprising a bar situated near the base to draw said wedge-block between the walls of the pedestal and base and directly against them and also comprising a rod having a screw-thread connection with the wedge and a connection with the bar, said devices and block being supported on and movable with the pedestal, substantially as described.

6. In a dental chair, the combination of the base, the pedestal rotatably supported on said base, the wedge-block situated between the pedestal and base, and devices to draw said wedge-block between the walls of said pedestal and base, said devices and the block being supported on and movable with the pedestal, the block-moving devices comprising a screw, a detachable screw-turning foot-bar and means for adjusting the bar with respect to the screw to compensate for wear, substantially as described.

7. In a dental chair, the combination of a pedestal comprising an oil-holder, a tube 8, a tube 7, both tubes being adapted to be moved into the holder, a piston-tube 33, and a pump situated adjacent the path of said tube 8, said tube 7 having an inset part 34 to permit it to descend into the oil-holder between the pump and said tube 8, substantially as described.

8. In a dental chair, the telescoping tubes 7 and 8, said tube 8 having a flange 10′ and the tube 7 having flange 12 and the inset 34 cut away at 35, whereby in assembling the parts, the tube 8 after its flange has been moved to a plane above the interior flange at the foot of tube 7 can be rotated to cause the holes in the flanges to register, substantially as described.

9. In a dental chair, the combination of the pedestal, the pump, the lever having members 20 and 24 the member 20 being fixed as at 22, exteriorly of the pedestal, to the rod 21, the said rod pivoted in the pedestal-wall, the short lever member 24 consisting of a sleeve secured to the said rod and provided with arms, a second rod 26 extending through said arms at their outer ends, a piston-rod 26′ loosely joined to said rod 26, and returning-springs attached to the latter rod and to the pedestal, substantially as described.

10. In a dental chair, the combination of a pump, a pedestal having a door-opening, a reservoir, a pump-operating lever having a member situated in the opening and provided with bearings fixed to the pedestal-wall, lever-returning springs, and a projection 28 arranged on the rotating part of the lever to engage the part 28′ of the pedestal and arrest the action of the springs, substantially as described.

11. In a dental chair the combination of a seat, a base, telescoping parts to guide the seat, and a frusto-conical split plug, bearing on one of the telescoping parts to guide the same, one of said telescoping parts having a frusto-conical seat coöperating with the plug.

12. In a dental chair, the combination of a seat, a base, intermediate telescoping parts to guide the seat, a frusto-conical split plug, and means thereby the plug may be adjusted to regulate the friction and to compensate for wear, one of said telescoping parts having a frusto-conical seat coöperating with the plug.

13. In a dental chair, the combination of the cross-bar of the seat-frame, the tube 8 provided with a shoulder 45, a nut engaging the tube above the shoulder to fasten the bar on the tube, said bar having a recess about the tube, and the nut being situated in said recess, and a plunger-rod loosely bearing on the nut, substantially as described.

In testimony whereof I have signed this specification in the presence of two subscribing witnesses.

FRANK RITTER.

Witnesses:
WM. F. LYNN,
CARROLL A. THOMPSON.